Patented July 9, 1940

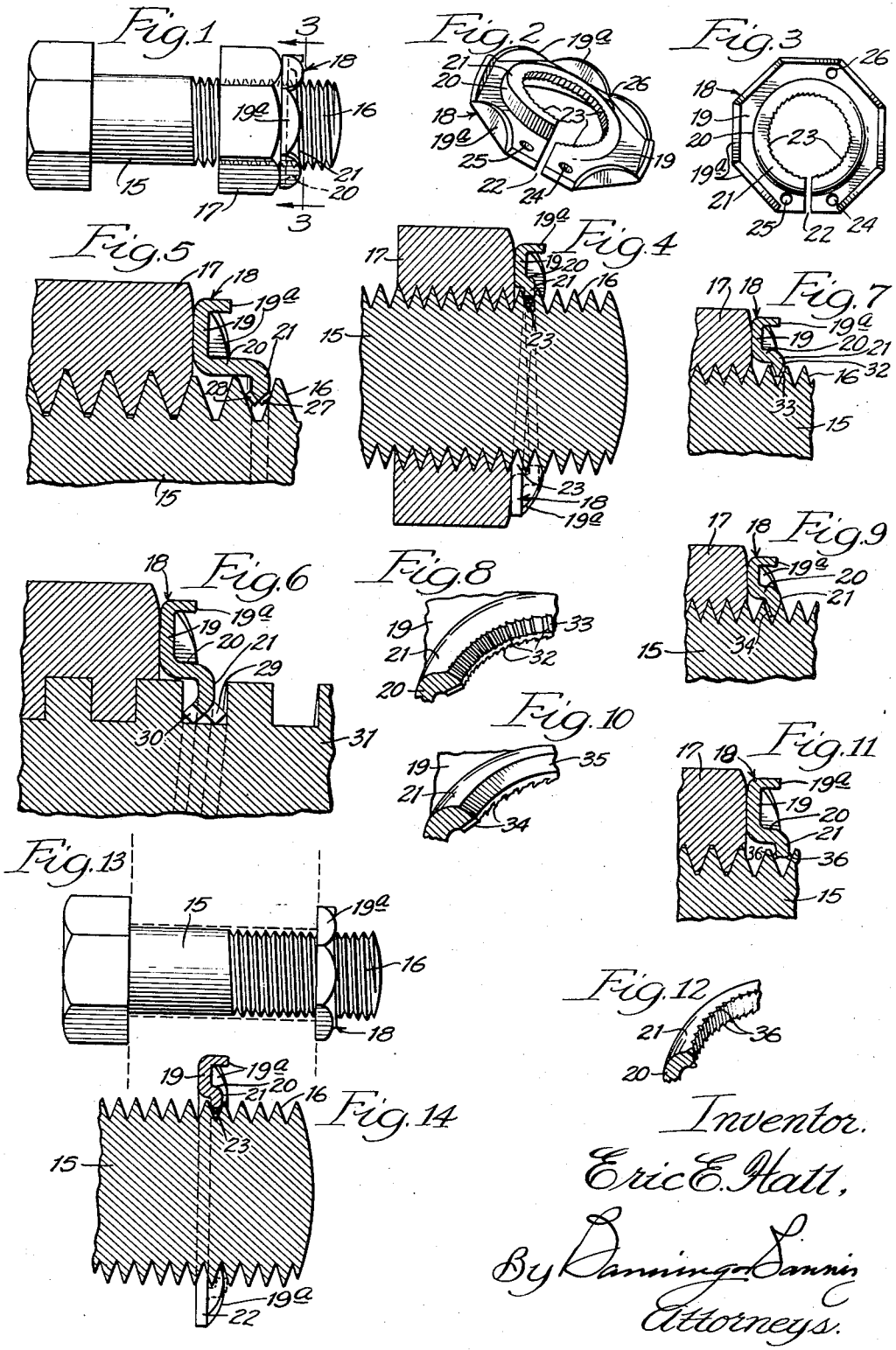

2,207,121

UNITED STATES PATENT OFFICE 2,207,121

NUT LOCK

Eric E. Hall, Chicago, Ill.

Application April 6, 1938, Serial No. 200,481

3 Claims. (Cl. 151—30)

This application is a continuation in part of an application, Serial No. 119,297, filed January 6, 1937 and abandoned April 28, 1938 in favor of this application.

The nut lock of the present invention is one which is designed in the form of a split washer which is adapted to be threaded down into tight contact with the nut or other element with which it is associated, and which will thereupon lock itself within the walls of the thread and bite into the surfaces of such thread walls in such a way as to prevent removal by unscrewing or in any other way than by springing or spreading the washer sufficiently to effect a release.

The invention in particular relates to the disposition and configuration of the teeth on the washer in such a way as to effect a tightening or imbedment of the teeth under pressure from the nut, and to the means provided for enabling the washer to be slightly sprung or spread as it is being screwed up into contact with the nut so as to enable the washer to be applied without difficulty.

Although the locking washer is intended primarily as a nut lock to prevent the retraction of a nut, it is also intended to be used independently for contact with a plate or any other element or device through which a bolt may be inserted, particularly in cases where severe end thrusts are not present, so that in the claims and elsewhere it will be understood that its use is not necessarily limited to an association with a nut as distinguished from some other element or device.

The invention is one which permits of certain variations in the formation and positioning of the teeth themselves, without, however, materially departing from the features of construction and combination of parts hereinafter described and pointed out in the claims.

In the drawing:

Figure 1 is a side elevation of a bolt and nut with the washer of the present invention applied thereto;

Fig. 2 is a perspective view of the washer of Fig. 1;

Fig. 3 is a plan view of the same;

Fig. 4 is an enlarged sectional detail of the washer of Fig. 1;

Fig. 5 is a similar view showing a modification in the arrangement of the teeth;

Fig. 6 is a similar view showing the washer of Fig. 5 applied to a square threaded bolt;

Fig. 7 is a modification showing the teeth arranged on both sides of the inner rim of the washer;

Fig. 8 is a perspective detail of the same;

Fig. 9 is a sectional detail showing the teeth arranged on one side only of the inner margin of the washer;

Fig. 10 is a perspective detail of the same;

Fig. 11 is a further modification showing the teeth formed on the corners of the inner edge of the washer;

Fig. 12 is a perspective detail of the same;

Fig. 13 is a side elevation showing the locking washer as used for direct contact with a plate or the like indicated in dotted lines, and without the inclusion of a nut; and Fig. 14 is a sectional elevation of the same disassociated from a nut.

As ordinarily used, the washer of the present invention is applied to a bolt 15 having threads 16 with a nut 17 thereon; and the washer 18 comprises a base plate 19 which, as shown, is of hexagonal form and preferably provided with marginal flanges 19ª to increase the width of the margin and reinforce the washer, so that a wrench, if used, may secure an adequate grip thereon.

The base plate affords a mounting for an upstanding collar 20 which is of progressively increasing height around the interior of the washer, and preferably rises from the plane of the plate on the right hand side as viewed in Fig. 2 to an elevation equal to the spacing of a single thread. The collar 20 is provided around its margin with an inwardly extending flange 21 which is of less width upon its inner face than the space between adjacent threads on the bolt, so that the flange will enter part way into the thread and engage the convergent walls of the thread to effect an interlock therewith. The washer is provided on one side with a slit or gap 22 which stands adjacent to the terminal points of the collar, so that on one side of the gap the collar will stand at its highest elevation while on the other side it will have merged into the plane of the base plate 19.

In order to make the impingement of the flange 21 effective to prevent rotation of the washer, the edge of the flange is provided, in the form shown in Figs. 2, 3 and 4, with inwardly facing saw teeth 23 which extend continuously around the flange, as shown, although the teeth might be fewer in number and stand in spaced relation to one another. However, where the nut is subjected to heavy vibrational effects, the continuity in the formation of the teeth will prove most effective.

The teeth, as shown, present their biting points in a counter-clockwise direction as viewed in Fig. 2, which presents the easy sliding back surfaces of the teeth in the clockwise direction and enables a right hand washer to be screwed to position without difficulty, although it is desirable that the normal inner diameter of the washer be slightly less than the diameter of the bolt threads at the point of impingement of the teeth, so that a slight spreading or opening of the washer will occur during the inthreading operation; and, in order to easily effect such a spreading, the base of the washer is provided with apertures 24, 25 and 26, the first two lying on opposite sides of the gap and the aperture 26 at a point near the opposite side of the washer but on the same side of the medial line as the aperture 24. By inserting a spanner wrench or the like in the apertures 25 and 26, the inthreading operation will tend to spread the washer slightly and thereby facilitate the screwing down of the washer into contact with the outer surface of the nut or other element or device with which the washer is associated, but in the final tightening, the spanner may be inserted in the holes 24—26, which tends to close up the gap.

The teeth, in the form shown, extend straight across the inner edge of the flange 21, so that each tooth, at its upper and lower ends, will present a sharp point or corner which will impinge against and into the thread walls of the bolt, and any tendency for the nut to retract will have the effect of increasing the impingement and consequent imbedment, so that the greater the force tending to cause retraction of the nut the greater will be the resistant effect afforded by the imbedment of the teeth into the bolt threads.

In the device of Fig. 2, the width or thickness of the flange 21 is sufficient to bring the end corners of the teeth into biting contact with the thread walls, but in cases where it is desirable to construct a lock washer of thinner material than would serve to advantageously bridge the space between the thread walls, the same result can be accomplished by the formation shown in Fig. 5, in which saw teeth 27 and 28 are alternately struck inwardly and outwardly, after the manner of an ordinary rip saw, to increase the spread of the biting edge of the flange, so that the teeth will engage the thread walls of the bolt at a point considerably outside of the base of the thread.

Fig. 6 shows a similar arrangement, in which alternate teeth 29 and 30 are struck outwardly and inwardly to present a biting contact with the threads of a square threaded bolt 31.

Figs. 7 and 8 show a modification in which the teeth 32, instead of being formed upon the inner edge of the flange 21, are formed upon the beveled faces 33 of the flange and present themselves outwardly toward the opposite walls of the thread, and in this formation the teeth can be made of adequate depth to bridge the space between the thread walls even though the washer be made of relatively thin material.

Figs. 9 and 10 show a similar formation, in which the teeth 34 are formed only on one face of the beveled edge of the flange, the opposite face 35 being smooth.

In Figs. 11 and 12, a similar result is obtained by employing the flange 21 with teeth 36 formed on one or both of the edge corners by notching or cutting the metal along the corners to produce outstanding pointed teeth adapted to engage the thread walls.

In Figs. 13 and 14, the nut is omitted, and the locking washer contacts directly against a plate or any other device through which the bolt may be entered, thereby subserving the combined functions of a nut and locking device, for which purpose the present invention is well adapted in view of the fact that the locking washer affords a flat area of contact against the outer surface of the element with which it is associated, in conjunction with an upwardly sloping collar which provides a spirally extending row of biting teeth which engage the spiral thread of the bolt throughout an entire convolution, thus extending the range of contact between the teeth and the bolt sufficiently to afford adequate resistance to thrust to enable the washer to perform the functions of a nut, especially in cases where the thrust is not excessive and beyond the capacity of the washer itself to resist.

The form of contruction particularly illustrated in Figs. 7 to 12 inclusive are of particular value from a manufacturing standpoint, in view of the fact that the teeth can be easily formed by cutting or notching the metal and displacing it to the extent necessary to give the toothed configuration without actually grinding or cutting away any of the material. The particular formation of the teeth will be determined in part by the service for which the nut lock is intended, but in all cases the arrangement is such as to present the edges or points of the teeth into biting impingement against the surface of one or both of the opposed thread walls of a thread, and a preferably at a sufficient distance from the base of the thread to enable the use of a washer of sufficient thickness of material and stiffness of structure to cause the necessary imbedment of the teeth into the thread walls when subjected to the pressure of the nut under influences tending to restrict it.

Furthermore, by providing a collar having a spirally extending inwardly facing flange, the flange will occupy the space within the thread throughout an entire convolution thereof, so that an extended gripping surface will be presented, and at the same time the base of the washer will be flat throughout and thus maintain a continuous flatwise contact with the outer face of the nut. This, together with a proper fitting of the washer to the bolt for which it is intended, will insure a tight and firm contact and permit the washer to be screwed up to the degree required to engage the nut or other element, irrespective of the thickness of the latter or its position on the bolt.

The washer can be easily stamped to the intended shape, and the teeth formed therein while the washer is in a comparatively soft condition, after which the washer may be properly tempered to afford the degree of hardness required to provide teeth adapted to imbed themselves into the softer material of the bolt threads, and at the same time, by proper choice of materials and proper treatment, the desired degree of flexibility may be imparted to the washer to enable it to be slightly spread or sprung during insertion to place or removal therefrom. If difficulty is experienced in the removal of the washer, it may be spread by the use of a wedge or the like to the degree required to free the teeth from engagement with the threads of the bolt.

Although the invention has been described with particularity as to detail, and various modifications shown by way of exemplification, it will be understood that the formation of the teeth may be additionally varied or modified, and the size, number, spacing, and arrangement varied, without departing from the spirit of the invention.

I claim:

1. In combination with a bolt and element through which the bolt is entered, a locking washer comprising a base portion adapted to lie flatwise throughout its area against the face of said element, and a spirally extending flange laterally projecting from one side of the base and provided with irregularities upon the face thereof along the inner margin, adapted to enter the space between the thread walls of the bolt and to bite into the surface thereof above the base of said walls, said washer having a radial split extending entirely across one side thereof whereby said washer as a whole is circumferentially expansible or contractible upon reverse operations of the washer on the threads of the bolt, said irregularities presenting abrupt and easy faces to permit the screwing of the washer to place and preventing retraction thereof upon such reverse operation thereof.

2. In combination with a bolt and element through which the bolt is entered, a radially split helically contractible locking washer provided with a flat base adapted to abut flatwise throughout its entire area against the outer face of said element, said base being provided with a progressively elevated collar of slightly less diameter than the portion of the bolt engaged thereby having formed thereon a spirally extending inwardly turned flange and said flange having teeth formed upon the inner face thereof and along the inner margin to cause biting thereof into the face of the wall of the bolt thread when subjected to the pressure of said element in an axial direction, and the split extending entirely across one side of said washer whereby the washer as a whole is circumferentially expansible or contractible upon reverse operations upon the threads of the bolt.

3. In combination with a bolt and element through which the bolt is entered, a radially split locking washer provided with a flat base adapted to abut flatwise throughout its entire area against the outer face of said element and provided with a progressively elevated collar of slightly less internal diameter than the bolt and having formed thereon a spirally extending inwardly turned flange, and said flange having teeth formed upon the face thereof along the inner margin to cause biting thereof into the face of the wall of the bolt thread when subjected to the pressure of said element in an axial direction, said washer having a radial split extending entirely across one side thereof whereby said washer as a whole is circumferentially expansible or contractible upon reverse operations of the washer on the threads of the bolt, said teeth being of saw tooth formation along the inner edge of the flange and some of said teeth being displaced laterally therefrom to increase the effective thickness of the flange and effect a biting contact with the adjacent thread wall upon such reverse operations thereof.

ERIC E. HALL.